United States Patent Office 2,790,606
Patented Apr. 30, 1957

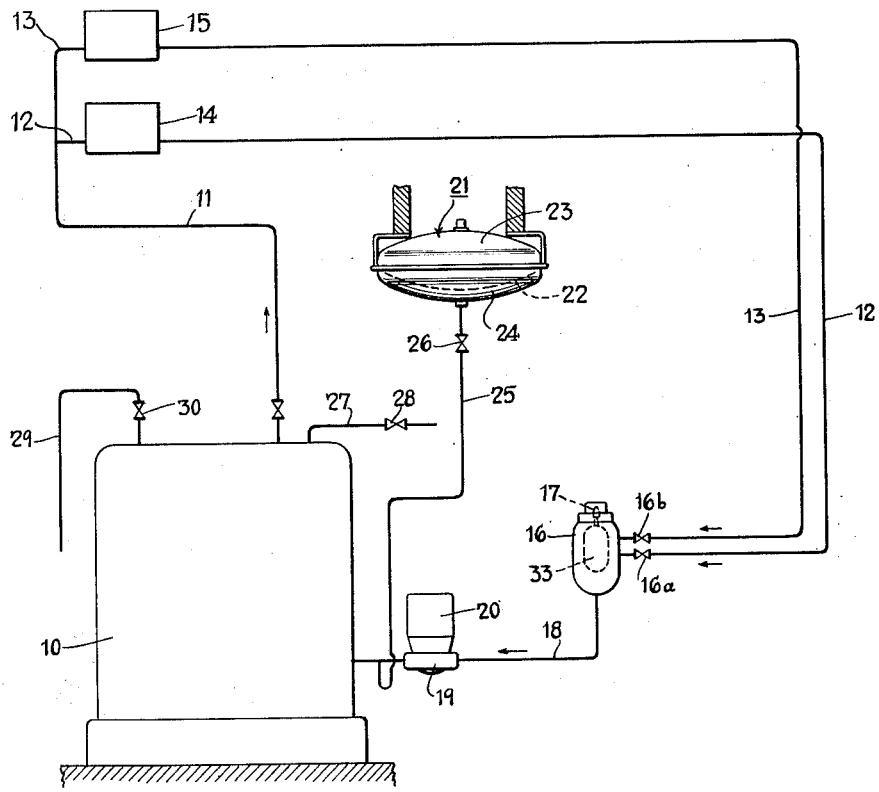
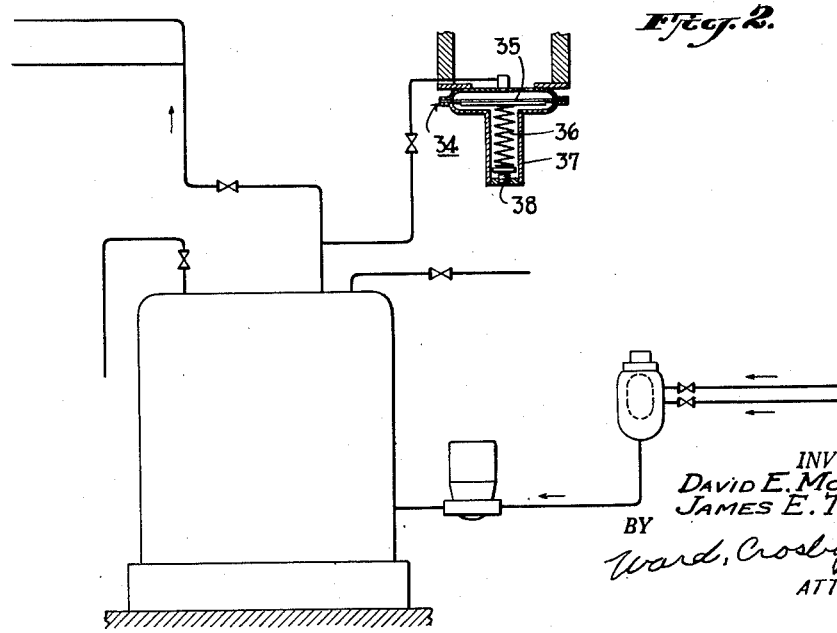

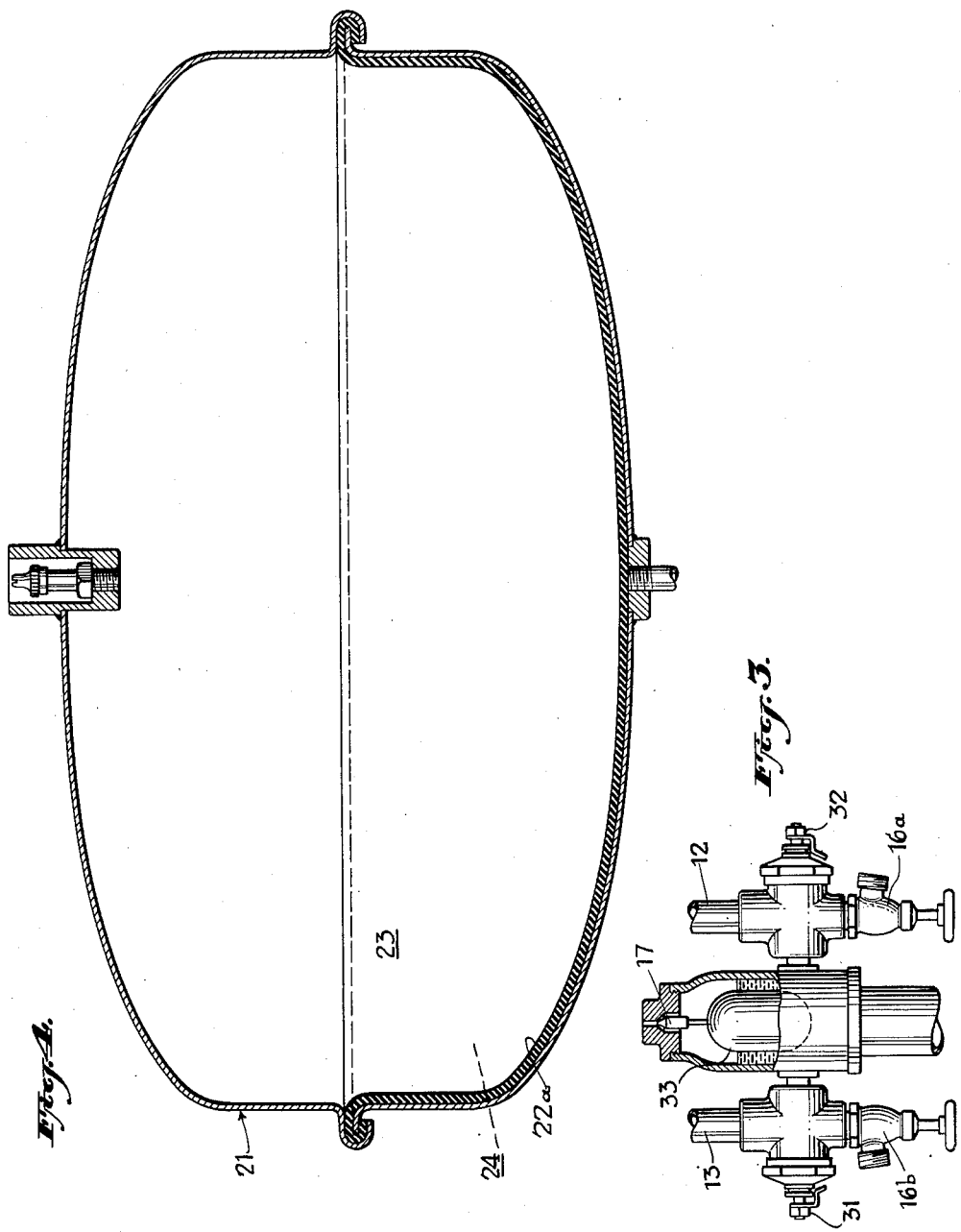

2,790,606

METHOD FOR EXPELLING AIR FROM A CLOSED HOT WATER SYSTEM

David E. Morgan, Pennsauken, N. J., and James E. Tolan, Narberth, Pa., assignors to Warren Webster & Company, Camden, N. J., a corporation of New Jersey Application September 4, 1953, Serial No. 378,512

1 Claim. (Cl. 237—63)

This invention relates to closed hot water heating systems, and more particularly to method and apparatus for automatically eliminating entirely all air in such systems.

In prior art hot water heating systems heretofore suggested having large radiators, large pipes and an expansion tank (at the peak of the system), the expansion of the circulatory medium and the occurrence of air in the system did not raise problems of any great significance inasmuch as air pockets in such old system did not seriously handicap operation. However, the development of the closed hot water heating system with a satisfactory circulating pump has brought about the use of small diameter piping and smaller radiators or "convectors." In such closed systems the formation of air bubbles is a serious hazard to proper operation of the system because of the ability of such bubbles to collect at certain points in the system and partially or wholly to prevent operation of the radiators or convectors. Such collection of air or formation of air blocks not only can isolate radiators but can restrict fluid flow. Also, in such prior closed hot water heating systems water expansion incident to heating has presented a substantial problem in that means have had to be provided to absorb such expansion, for example, an expansion tank employing air as the compressible medium. Such air usually has been in direct contact with the water in the tank thereby presenting the well known problem of waterlogging of the tank and the consequent carrying of the air into the system. In order to solve the closely related problems of the formation of the aforementioned air blocks and expansion of the circulatory medium, suggestions have heretofore been made to employ multiple air vents, a costly expedient, and to employ special means for trapping and directing any air in the conduit system back to the expansion tank. Or, alternatively to the latter, means have been suggested for merely preventing air in the expansion tank from escaping into the system. Such methods and apparatus suggested in the past for solving the air block and water expansion problems have not proved satisfactory or economical for a number of reasons, for example, because of water discharge from the multiple air vents in the system throughout the building being heated, the need to grade or cant the piping to the many vents, the aforementioned waterlogging of the expansion tanks with consequent air binding of the system and reduction of the air cushion, the high cost of special prior devices to direct the air in the system back to an expansion tank and to prevent water circulation between such tank and system, and the high cost of the numerous air vents.

One of the objects of the present invention is to overcome the above difficulties or reduce same to insignificance.

A further object is to provide a novel method and apparatus for automatically and continuously eliminating any air which may enter a closed hot water heating system, whereby the system is maintained air free.

The invention, in one aspect thereof, comprises the method for eliminating air from a closed hot water heating system which includes travelling such water through the conduits of the system at a velocity of 2 F. P. S. or greater, the water thereby being enabled to entrain air in the system and direct same to a single collection station wherein the velocity of such water is slowed to a value of the order of ½ F. P. S. or less thereby liberating any air entrained or absorbed therein, such air thereupon being collected, venting such collected air to the atmosphere in response to the water level at such station reaching a preselected value, and concurrent with the above, subjecting said water directly to yieldable membrane pressure. Such single collection station can be located in the boiler room of the system where maintenance thereof can be easily accomplished.

The invention, in another aspect thereof, embraces a heating system employing an expansion absorber chamber having therein a deformable or flexible membrane which, around the margin thereof, is held in fluid-tight engagement with the inner surface of such chamber. Such membrane divides the chamber into two subchambers, one of which is subjected to an initial charge of gas under pressure (for example, 15 p. s. i. g.) which urges the membrane into close engagement with the inner surfaces of the opposite subchamber within such tank prior to the entry of water under pressure thereby substantially entirely expelling the air therefrom. Expansion of the water due to heating is thus accommodated. Such initial charge greatly reduces the size of such absorber which would otherwise be needed, and minimizes any heat loss there. The heating system may have one or more radiators therein and is provided with a power driven pump for forcing water therethrough. Also means are provided for feeding water into the system at a preselected pressure (for example, 12 p. s. i. g.) and for continuously maintaining such pressure by automatically injecting additional water therein in response to water pressure falling below such preselected value. Preferably a single air accumulator chamber is interposed in the system, such accumulator chamber being relatively enlarged in volume and permitting the water flowing through the system to be slowed in velocity to a value of ½ F. P. S. or less wherein absorbed and/or entrained air is liberated from the water and vented to the atmosphere in an air vent in such chamber which opens in response to water level reaching a desired value. The actuation of the power driven pump forces the liquid through the pipes in the system, which may be of relatively smaller inner diameter, at a velocity of substantially 2 F. P. S. or greater, thereby permitting the employment of such relatively smaller inner diameter pipes and insures entrainment of residual air which may be located in remote pockets and remote points of the system, such air being moved to the aforementioned accumulator chamber and there vented to the atmosphere. Thus all of the air in the system will, within a relatively short time, for example, a few days, be automatically expelled therefrom excepting of, of course, possibly a small volume within the air accumulator chamber itself.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel methods and combinations of features and method steps as may be shown and described in connection with the system herein disclosed.

In the drawings:

Fig. 1 is a schematic diagram showing one form of system embodying the present invention;

Fig. 2 is a further schematic diagram showing a modification of the system of Fig. 1; and Fig. 3 is a cross-sectional view of an accumulator chamber and an air vent therein which is employed in the present invention; and Fig. 4 is a cross-sectional view of an expansion tank employed in the embodiment of Fig. 1.

Referring to the drawings in greater detail, the novel system comprises a water heater or boiler 10 having associated therewith a suitable heat source for heating the water. The boiler 10 comprises a portion of a closed hot water heating system, including, for example, a main outflow conduit 11 in communication with subconduits 12 and 13 in which are respectively interposed radiators 14 and 15, such subconduits 12 and 13 directing the flow of water to a relatively enlarged container 16 comprising an accumulator chamber having an air vent 17 therein. Such accumulator chamber is also referred to as a "return header." The base of the accumulator chamber 16, by means of a conduit 18, is connected to the boiler 10 thereby returning the water flow to such boiler.

In order to minimize the size of the conduits required by and to increase greatly the efficiency of the heating system, a pump 19 is interposed in the system preferably in the conduit 18, such pump being driven by electric motor 20.

For the purposes of accommodating the increased volume of the water (or other circulatory medium) which occurs in response to heating same, and also for the purpose of providing means for maintaining the water of the system under a desired pressure to aid in accumulating and venting to the atmosphere within, for example, a few days, all the residual air in the system, an expansion chamber 21 is provided having a flexible membrane 22 therein of rubber or rubber-like material separating same into two chambers 23 and 24. The membrane 22 at the margin thereof is secured in fluid-tight engagement with the inner surface of the expansion tank 21. Initially and before water is introduced into the system, it is desirable to inject air or some other suitable gas under pressure into the chamber 23 thereby to deform the membrane 22 to the condition shown in solid lines at 22a in Fig. 4. All the air is thus eliminated from the subchamber on the water side of the diaphragm. The air pressure at the outset within chamber 23, for example, thus may be of the order of 15 p. s. i. g. The expansion tank 21 is connected into the closed hot water heating system by means of a conduit 25 having a suitable stop valve 26 therein.

The conduit 25 may be connected to the conduit 18, preferably at the lower surface thereof, because the air bubbles normally move along the upper surface of such conduit. Thus this type of connection will minimize accumulation of air within the chamber 24 due to such bubbles.

Water is introduced into the system through a conduit 27 in which there is interposed a suitable pressure sensitive control valve 28 which may be adjusted for introducing water under pressure into the system when the water presure therein falls below a preselected value, for example 12 p. s. i. g.

Suitable relief valve means also are provided for the system comprising a relief conduit 29 in which is interposed a conventional relief valve 30 which may be adjusted to relieve the pressure of the system when it reaches, for example, 30 p. s. i. g.

Interposed in the conduits 12 and 13 adjacent the return header 16 are suitable purge valves 16a and 16b (Fig. 1) which are provided for the purpose of quick initial filling with water and purging of air.

As shown in Fig. 3, there also may be interposed in the conduits 12 and 13 balance valves 31 and 32.

The return header (accumulator means) and air vent means comprises a suitable chamber of relatively large size into which the water is directed and wherein the water velocity therein is reduced, for example, from 2 F. P. S. or greater in the aforementioned pipes or conduits (for example, 11, 12, 13 and 18) down to substantially ½ F. P. S. or less which is sufficiently low to permit the water to give up any absorbed or entrained air, such air collecting at the top of the accumulator chamber until sufficient in quantity to cause the lowering of a float 33 therein from its initial position, as shown in Figs. 1 and 3, to a lowered position wherein the valve 17 is opened and the air collected in the top of the chamber 16 is permitted to escape until the float 33 reassumes a valve closing position.

It is general practice to inject water at room temperature or cold water into the system initially at the outset of the operation thereof, whereby most of the air in the system is driven into the return header 16 and there vented to the atmosphere via the purge valves 16a, 16b and vent 17. The circulation of such cold water through the system will normally not remove the residual air pockets which by the present invention can be gathered up in response to operation of the system intermittently or continuously over a period of, e. g., several days. Heat is applied to the water in the heater 10 and the motor 20 is energized thereby actuating the pump 19 to force water through the system. The velocity of the water in such conduits as 11, 12 or 18 may be, as aforementioned, of the order of 2 F. P. S. or greater but in the accumulator 16 is of the order of ½ F. P. S. or lower. The application of heat to the water increases the volume thereof by a substantial percentage. For example, between 40 and 220° F. water will expand by volume substantially 4½%. In the water heater 10 the temperature of the water normally is raised to about 220° F. but in a heating system of the type shown this temperature may be increased, for example, to 275° F. without boiling by virtue of the closed nature of the system. The water consequently enters the chamber 24 of the expansion absorber 21 via the conduit 25 and may, for example, urge the diaphragm 22 to the central position shown in solid lines in Fig. 1 wherein the water pressure is equalized against the pressure of compressed air at a value, for example, of 25 p. s. i. g. The absorber 21 may be of very substantially reduced size due to the initial gaseous charge of e. g. 15 p. s. i. g., in one subchamber.

The expansion in volume of the water following such application of heat, which expansion is accommodated in the aforedescribed expansion absorber, of course, increases the pressure of such water as compared to the pressure in the system prior to heating. Such increase in pressure enhances the power of the water to entrain and carry away and/or to absorb the residual air collected at various random locations within the system. This characteristic of the water in the system, together with the velocity thereof in the conduits (as opposed to the accumulator 16), as produced by the pump 19 and the motor 20, insures a purging of such residual air from the system within a reasonably short time. In those portions of the system wherein the velocity of the water is of the order of 2 F. P. S. or greater, the residual air will be either absorbed or entrained and eventually moved into the accumulator 16. In those portions, as in the radiators 14 and 15, wherein the velocity of the water may be below such value (2 F. P. S.), the increased pressure of the heated water within the system occurring as a result of the operation of the expansion chamber 21, will aid in entraining such air and thus in the accumulation thereof in the return header 16.

Thus in the novel system set forth above there is a novel coaction between: the expansion absorber means having the deformable membrane 22, the accumulator and air vent means 16, 17, together with the aforementioned power driven pump 19. In view of the fact that the system is a closed one and that the water therein is at all times prevented from contacting the air of the atmosphere (except, of course, with respect to the residual air in the system and with respect to the negligible amount of air which is collected in the accumulator 16), there will be intermittently or continuously, depending upon operation of the motor 20, a purging from the system in a highly efficient manner of such residual air and any other air which may enter the system, which air otherwise might isolate one or more of the radiator units.

The modification of the system shown in Fig. 2 is identical to that shown in Fig. 1 with the exception of the construction of the expansion absorber. In the modification of Fig. 2, an expansion absorber 34 is provided which employs a flexible diaphragm 35 which is secured along the margin thereof in fluid-tight engagement with the sides of the expansion tank. The diaphragm 35 may be, for example, of a flexible substance preferably of rubber or rubber-like material which is normally held in the position shown in Fig. 2 by means of a coil spring 36 which engages the central region thereof and is held in position by a suitable sleeve 37. The distortion of the spring 36 may be adjusted by means of a screw 38 in a conventional manner.

There is thus provided a novel closed hot water heating system having novel means for automatically eliminating entirely all the air therein which is capable of forming air blocks. The system thus becomes solely an hydraulic one. Since the system, after a relatively short period of operation, has no substantial amounts of air therein (except perhaps very small amounts of residual air which are insignificant in amount and have no appreciable adverse effect on the operation of the system), it is not necessary to employ special "fittings" or devices, such as those disclosed, for example, in United States Patents 2,395,697 and 2,500,621, and related types of devices for segregating air and leading it back to an old type expansion tank. Furthermore, the present apparatus increases the velocity of the water in the pipes of the system to a point wherein it will carry air to a central collecting means where venting of the atmosphere can be accomplished by a central venting means. Such single collecting means may be located in, for example, the boiler room where maintenance thereof can be easily accomplished and where any water discharge therefrom will be less objectionable than at other locations of the building containing the system. Normally water will not discharge from the venting means but emergency conditions may arise which will cause it. Also the novel system eliminates the need for the canting or grading of pipes. There is a complete separation of air and water with respect to the expansion absorber. Compressed air or gas is admitted to a subchamber on one side of the diaphragm of the expansion absorber, usually before installation of the system, such compressed air or gas causing the diaphragm to displace the volume of the other subchamber. Water is injected into the system, for example, under 12 lbs. pressure, e. g., at room temperature, engages the diaphragm and is unable to move same initially because of the relatively lower water pressure. Any air adjacent the water side of the diaphragm can be vented by a suitable valve in the expansion absorber. When the water is heated and expands, it, of course, will cause the diaphragm to displace against the air or gas cushion an amount necessary to absorb the amount of the water expansion.

While the invention has been described with respect to certain preferred examples which have given satisfactory results, it will be understood that various changes and modifications may be made without departing from the spirit and scope of the invention as the same is understood by those skilled in the art, and it is intended therefore in the appended claim to cover all such changes and modifications.

What is claimed is:

The method for automatically expelling air from a closed hot water system having a flexible membrane type expansion absorbing chamber, such system including conduits, some of which are of relatively restricted cross-sectional size, which method consists in urging such flexible membrane against an interior surface of such chamber in response to pressure of a compressed gaseous substance on the opposite side of the membrane thereby to exhaust from such chamber the air initially between such membrane and surface, the region between such membrane and surface being in communication with said system, injecting water into such system substantially to fill same, venting the initial portion of air in the system, applying heat to such water while forcing such heated water through the aforementioned relatively constricted conduits of such system at a velocity of at least 2 F. P. S., such water expanding in volume under the influence of such heat thereby urging at least a portion of such flexible membrane away from such interior surface, the water expansion being thereby resilently resisted within such system and further compressing such gaseous, substance, the water in such system being separated from and free of contact with such gaseous substance acting upon the aforementioned opposite side of the membrane, the heated water being thus placed under increased pressure in said system, and being conditioned for more readily extraining residual air in such system when the water is moved therethrough at the aforementioned velocity, the stream of water while flowing through such system also flowing through an accumulator region thereof which is of relatively enlarged size and in which the velocity of the water flowing therethrough is reduced to substantially ½ F. P. S. or less and wherein residual air entrained by such water is liberated, and venting such liberated air to the atmosphere in response to a preselected water level occurring in such accumulator region.

References Cited in the file of this patent

UNITED STATES PATENTS

| Number | Name | Date |
|---|---|---|
| 381,731 | Walker | Apr. 24, 1888 |
| 402,076 | Gates | Apr. 23, 1889 |
| 1,684,834 | Larsen | Sept. 18, 1928 |
| 1,775,362 | De Marcus | Sept. 9, 1930 |
| 2,061,605 | Yoder | Nov. 24, 1936 |
| 2,224,929 | Rose et al. | Dec. 17, 1940 |
| 2,434,596 | Spieth | Jan. 13, 1948 |
| 2,489,491 | Johnson | Nov. 29, 1949 |
| 2,695,753 | Kirk | Nov. 30, 1954 |

OTHER REFERENCES

"Sarcotherm Weather Control for Hot Water and Radiant Heating," received August 11, 1945, pp. 5 and 10, published by Sarcotherm Controls, Incorporated, 222 North Bank Drive, Chicago 54, Illinois.